United States Patent
Berglund et al.

(10) Patent No.: US 10,375,694 B2
(45) Date of Patent: Aug. 6, 2019

(54) METHOD AND AN APPARATUS FOR DETERMINING A BEAM TO DIRECT A SIGNAL TO BE TRANSMITTED TO A USER EQUIPMENT

(71) Applicant: Telefonaktiebolaget LM Ericsson (publ), Stockholm (SE)

(72) Inventors: Joel Berglund, Linköping (SE); Mirsad Cirkic, Linköping (SE); Erik Eriksson, Linköping (SE); Reza Moosavi, Linköping (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/578,323

(22) PCT Filed: Jun. 10, 2015

(86) PCT No.: PCT/SE2015/050673
§ 371 (c)(1),
(2) Date: Nov. 30, 2017

(87) PCT Pub. No.: WO2016/200302
PCT Pub. Date: Dec. 15, 2016

(65) Prior Publication Data
US 2018/0152933 A1    May 31, 2018

(51) Int. Cl.
*H04W 72/04* (2009.01)
*H04W 16/28* (2009.01)
(Continued)

(52) U.S. Cl.
CPC ......... *H04W 72/046* (2013.01); *H04W 16/28* (2013.01); *H04W 76/25* (2018.02);
(Continued)

(58) Field of Classification Search
CPC ... H04W 72/046; H04W 76/25; H04W 16/28; H04W 88/02; H04W 4/02; H04W 4/04; H04W 72/04
See application file for complete search history.

(56) References Cited

U.S. PATENT DOCUMENTS

2009/0225716 A1* 9/2009 Chen .................... H04B 7/0689
  370/329
2013/0059619 A1* 3/2013 Kim .................... H04W 72/046
  455/509

(Continued)

FOREIGN PATENT DOCUMENTS

EP    2 326 117 A1    5/2011
EP    2326117 A1 *    5/2011 ............ H04W 16/28

(Continued)

OTHER PUBLICATIONS

Supplementary European Search Report for Application No./Patent. No. 15895078.2-1215/3308569—May 2, 2018.

(Continued)

*Primary Examiner* — Lan-Huong Truong
(74) *Attorney, Agent, or Firm* — Baker Botts, LLP (57) ABSTRACT

A method performed by a network node for determining a beam to direct a signal to be transmitted from the network node to a user equipment in a wireless communications network. The network node obtains (302) information related to a sequence of beams associated with the user equipment. The network node further determines (304) the beam based on the information related to the sequence of beams.

14 Claims, 7 Drawing Sheets

(51) Int. Cl.
*H04W 76/25* (2018.01)
*H04W 4/02* (2018.01)
*H04W 4/04* (2009.01)
*H04W 88/02* (2009.01)

(52) U.S. Cl.
CPC ........... *H04W 4/02* (2013.01); *H04W 4/04* (2013.01); *H04W 88/02* (2013.01)

(56) References Cited

U.S. PATENT DOCUMENTS

| | | |
|---|---|---|
| 2013/0084908 A1 | 4/2013 | Joo |
| 2014/0323144 A1* | 10/2014 | Kim .................. H04B 7/0617 455/452.1 |

FOREIGN PATENT DOCUMENTS

| | | |
|---|---|---|
| WO | 2014 036150 A1 | 3/2014 |
| WO | 2015 027118 A1 | 2/2015 |

OTHER PUBLICATIONS

International Search Report for International application No. PCT/SE2015/050673—Jan. 18, 2016.

\* cited by examiner

| 11 | 12 | 13 | 14 |
|----|----|----|----|
| 21 | 22 | 23 | 24 |
| 31 | 32 | 33 | 34 |
| 41 | 42 | 43 | 44 |

METHOD AND AN APPARATUS FOR DETERMINING A BEAM TO DIRECT A SIGNAL TO BE TRANSMITTED TO A USER EQUIPMENT

PRIORITY

This nonprovisional application is a U.S. National Stage Filing under 35 U.S.C. § 371 of International Patent Application Serial No. PCT/SE2015/050673 filed Jun. 10, 2015, and entitled "A Method And An Apparatus For Determining A Beam To Direct A Signal To Be Transmitted To A User Equipment."

TECHNICAL FIELD

Embodiments herein relate to an apparatus and a method therein for determining a beam to direct a signal to be transmitted from a network node to user equipment.

BACKGROUND

Communication devices such as User Equipments (UE) are also known as e.g. Mobile Stations (MS), mobile terminals, and wireless terminals. UEs are enabled to communicate wirelessly in a wireless communications network or wireless communication system, sometimes also referred to as a cellular radio system or cellular networks. The communication may be performed e.g. between two UEs, between a mobile station and a regular telephone and/or between a mobile station and a server via a Radio Access Network (RAN) and possibly one or more core networks, comprised within the wireless communications network.

Examples of wireless communication systems are Long Term Evolution (LTE), Universal Mobile Telecommunications System (UMTS) and Global System for Mobile communications (GSM).

UEs may further be referred to as mobile telephones, cellular telephones, laptops, or surf plates with wireless capability, just to mention some further examples. The UEs in the present context may be, for example, portable, pocket-storable, hand-held, computer-comprised, or vehicle-mounted mobile devices, enabled to communicate voice and/or data, via the RAN, with another entity, such as another mobile station or a server.

The wireless communications network covers a geographical area which is divided into cell areas, wherein each cell area being served by an access node such as a Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the UEs within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

Mobile data traffic is growing exponentially due to an enormous success of smart phones, tablets and other data traffic appliances. A traditional way to increase the data rate in wireless communication networks has been to increase the transmission bandwidth. However, the available spectrum has become scarce due to an increase in wireless access systems. Hence a challenge for future wireless access systems is to find alternative solutions to meet high demands on the data rate.

One way of handling increased wireless data traffic in the wireless communications network is to deploy more BSs and densify the wireless communications network. However, this will increase interference and deployment cost.

Another, seemingly simpler option in terms of deployment cost, for increasing the data rate is to introduce more antennas at the base station. By using more antennas at a transmitter, it is possible to direct a transmitted signal to intended user equipment. This is known as beamforming in the literature. Additionally, with many base station antennas it is also possible to simultaneously transmit payload data to multiple user equipment on the same frequency and/or time resources. This is often referred to as multi-user scheduling.

When performing beamforming, the transmitter needs to have some kind of channel knowledge such that it knows how to shift the amplitude and phase of the different antenna elements. In LTE, this channel knowledge may be obtained through channel reciprocity or through Channel State Information (CSI) reports. In for example Transmission Mode (TM) 10, the UE is set up to measure on certain reference signals, CSI Reference Signals (CSI-RS). The UE then reports the CSI in the uplink in the form of a Channel Quality Indicator (CQI), a Rank Indicator (RI) and a Precoding-Matrix Indicator (PMI). The PMI indicates which precoder to use at the transmitter, that is, which weights to put on the antenna elements such that the energy is transmitted towards the UE.

A different way to obtain the channel knowledge is to transmit different beams and let the UE measure on those and report back one or more preferred beams. In the case of reporting the best beam, the UE would only need to indicate which beam to choose from instead of a precoder index indicating phase shifts. This means that the UE only has to measure the signal strength of the beam rather than trying out different phase shifts and estimate the corresponding quality. A cell, or in other words the base station, may send out a large number of beams to measure on in all possible directions. However, this costs significant energy and overhead in the cell.

Moreover, for high mobility UEs, and/or narrow data beams, the antenna gain may quickly drop such that every time the base station receives a feedback, it is to some extent no longer valid, thus making a beamforming choice less effective. In other words, as a reported CSI quickly may become outdated with a high mobility user equipment, the user equipment risks receiving the data sent through a beam which is not best suited for the instantaneous position but rather for a previous position.

SUMMARY

An object of embodiments herein is to enhance the performance of a wireless communications network.

Embodiments herein improve the determination of beams or in other words improve the determination of an antenna array or a precoding vector to direct a signal to be transmitted to a user equipment.

According to a first aspect of embodiments herein, the object is achieved by a method performed by a network node for determining a beam to direct a signal to be transmitted from the network node to a user equipment. The network node and the user equipment operate in a wireless communications network.

The network node obtains information related to a sequence of beams associated with the user equipment.

The network node determines the beam based on the information related to the sequence of beams.

According to a second aspect of embodiments herein, the object is achieved by a network node for determining a beam to direct a signal to be transmitted from the network node to a user equipment. The network node and the user equipment are configured to operate in a wireless communications network.

The network node is configured to obtain information related to a sequence of beams associated with the user equipment.

The network node is further configured to determine the beam based on the information related to the sequence of beams.

Since the network node determines the beam based on the information related to the sequence of beams associated with the user equipment, the determination of the beam is improved. The improved determination results in that the system performance of the wireless communications network is enhanced. Especially user equipment throughput is enhanced.

In particular, embodiments herein improve the performance of the determination of the beam in scenarios where it may not be possible to acquire accurate enough CSI or accurate channel statistics at the network node. This may for example be during the initial data transmission or when the user equipment travels with relatively high speed.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed.

A problem with prior art is to handle measurements related to beams when a UE is moving. An improved algorithm may send out beams in an area around the previously reported beam. This may be more efficient if the smaller area is significantly less than the coverage area of the entire cell. However, also this algorithm often sends a large number of unnecessary beams.

Further, as a reported CSI quickly may become outdated with a high mobility user equipment, the user equipment risks receiving the data sent through a beam which is not best suited for the instantaneous position but rather for a previous position.

Embodiments herein improve the determination of a beam by capturing correlations in mobility patterns. For example, with embodiments herein the network node may restrict the beam search space to those beams that are most probable to be relevant based on beforehand collected sequences of beams also referred to as beamforming patterns. The beforehand collected sequences of beams may e.g. be stored in a database. This restriction of the beam search space may be used as a complementing tool to the reported beams from the user equipment since the sequences of reports from the user equipment may be used to map the available sequences of beams, i.e. classify or associate the user equipment, to a beam forming pattern which results in a high performance of the beamforming. The reported beams may also be used to continue improve the database of beamforming patterns, i.e. used for statistics collection for future beamforming patterns.

In other words, embodiments herein determine a beam to direct a signal to be transmitted to a user equipment, e.g. by restricting the set of beams that is to be searched for each user equipment. The determination, and thus the restriction, is based on information related to a sequence of beams associated with the user equipment. The sequence of beams may also be referred to as a beam pattern or beam trace. Information related to a sequence of beams associated with the user equipment may comprise some information related to historical behavior, of the user equipment. Additionally the restriction may be based on some information related to historical behavior of other UEs.

More specifically, interesting behavior of the UEs to monitor is related to beamforming patterns, for instance beamforming patterns related to directional movements, mobility patterns and/or directional changes.

Figure 1:
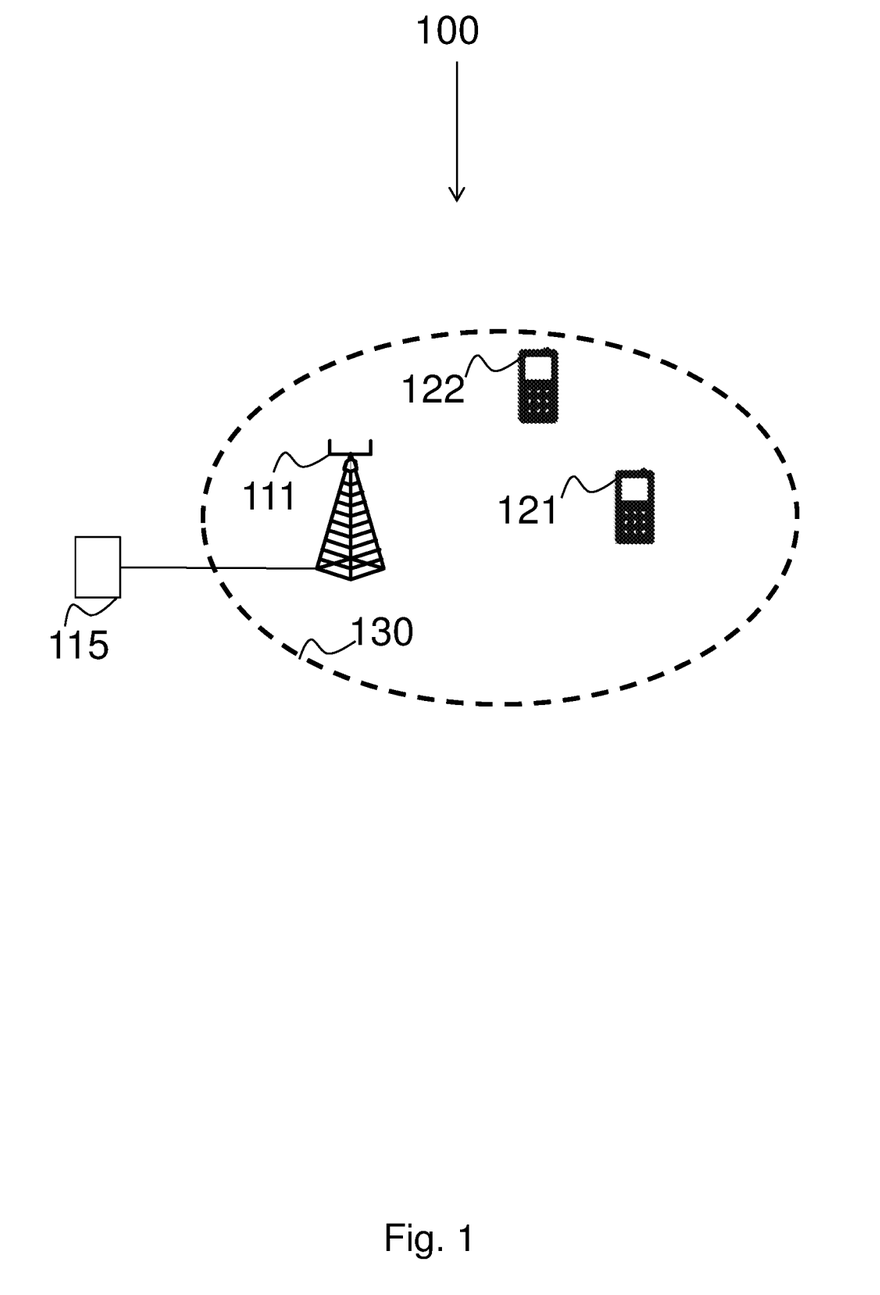
FIG. 1 is a schematic block diagram illustrating a wireless communications network in which embodiments herein may be implemented.

Embodiments herein relate to wireless communication networks in general. FIG. 1 is a schematic block diagram depicting a wireless communications network 100 also known as a radio communications network, a telecommunications network or similar. The wireless communications network 100 may comprise one or more Radio Access Networks (RAN) and one or more Core Networks (CN). The wireless communications network 100 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMAX), BLE, Wi-Fi or Ultra Mobile Broadband (UMB), just to mention a few possible implementations.

In the wireless communications network 100 network nodes capable of communicating with user equipment operate. For example a network node 111, 115 capable of communicating with user equipment operates in the wireless communications network 100. The network node 111, 115 is configured to operate in the wireless communications network 100. In some embodiments the network node 111, 115 is a network node capable of radio communication, e.g. a base station 111. The network node 111, 115 may also be referred to as a radio base station and e.g. a NodeB, an evolved Node B (eNB, eNode B), a base transceiver station, Access Point Base Station, base station router, or any other network unit capable of communicating with user equipment.

In some other embodiments the network node 111, 115 is a network node that communicates with the user equipment via a radio network node. In this case the network node 111, 115 may for example be a Radio Network Controller (RNC) 115.

In some embodiments the functions performed in the network node 111, 115 may be performed by several distributed nodes, such as the base station 111 and the RNC 115.

A user equipment 121, also known as a mobile station, wireless device, wireless communications device and/or a wireless terminal, operates in the wireless communications network 100. For example, the user equipment 121 may communicate with the wireless communications network 100 via radio network nodes, such as the base station 111. The user equipment 121 may for example communicate with the network node 111, 115. There may of course be more than one user equipment in the wireless communications network 100, for example a second user equipment 122.

It should be understood by the person skilled in the art that "user equipment" is a non-limiting term which means for example any wireless communications device, wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station.

The wireless communications network 100 covers a geographical area which may be divided into cell areas, e.g. a cell 130 being served by the base station 111. A cell is a geographical area where radio coverage is provided by radio base station equipment at a base station site or at remote locations in Remote Radio Units (RRU).

By using beams the base station 111 is able to direct a radio signal to the user equipment 121 located in the cell 130.

It should be noted that the following embodiments are not mutually exclusive. Components from one embodiment may be tacitly assumed to be present in another embodiment and it will be obvious to a person skilled in the art how those components may be used in the other exemplary embodiments.

A method is disclosed herein for determining a beam to direct a signal to be transmitted from the network node 111, e.g. the base station 111, to the user equipment 121. As the user equipment 121 may be moving, e.g. when located in a car, and the channel is changing, the feedbacks from the user equipment 121 need to be updated such that they reflect current channel conditions. The moving user equipment 121 may be described with a velocity and a direction of this velocity.

In a first action the network node 111, 115 monitors and collects prior knowledge related to the behavior of user equipments, such as the user equipment 121 and the second user equipment 122, in terms of beam forming patterns, i.e. a sequence of beams. The beam forming patterns may be related to directional movements of the user equipments. For example, there may be beam forming patterns related to user equipment travelling with a high speed in a certain direction, and there may be other beam forming patterns related to user equipment travelling with a low speed in a certain direction. The network node 111, 115 may store the beam forming patterns in a database for further use. The user equipments may be classified in or associated with different beam forming classes, i.e., user equipment that share beam forming statistics or beam forming patterns. For example, there may be one class for user equipment travelling with a high speed on the country side and there may be another class for user equipment travelling with a low speed in the city.

Once the information related to the beam forming pattern is obtained, the network node 111, 115 determines a beam to direct a signal to be transmitted to the user equipment 121, based on the obtained information.

The determining may comprise initiating the beam forming algorithm for the user equipment 121 based on this obtained information.

The beam tracking and/or reporting may be constrained more appropriately according to the collected knowledge. An advantage is that the beam reporting is reduced to a few alternatives of estimated beams, or in other words beamformers.

The network node 111, 115 may keep collecting data related to the beam forming behavior of user equipment, such as the user equipment 121, and may update the prior information. If needed, the network node 111, 115 may go back to gather more information.

Estimated beamformers do not need to be restricted to those in a codebook, i.e. they do not need to be restricted to predetermined beams. Further the estimated beamformers may also be applied for pilot signals, which are reference symbols used for channel estimation of the received channel. That is, the estimated beamformers may also be applied to reconfigure how the different pilot signals are mapped to specific antenna elements, e.g. port to antenna mapping, and not only to data. This helps extending the coverage area of the cell 130 as it provides means of making more accurate beamforming of for example the Enhanced Physical Downlink Control Channel (EPDCCH) in LTE. The network node 111, 115 may keep monitoring the used precoders/beamforming vectors and update the database accordingly.

The term precoder or beamforming vector or beamformers may relate to a single precoder/beam or a set of possible precoders/beams and relates to the antenna pattern used for transmitting a signal. The signal may be data or a reference signal, where the reference signal may be used for demodulation and/or channel state measurements.

Actions for determining a beam to direct a signal to be transmitted to the user equipment 121 according to embodiments herein will now be described in more detail in relation to FIG. 2, FIG. 3 and FIGS. 4a-c.

Figure 2:
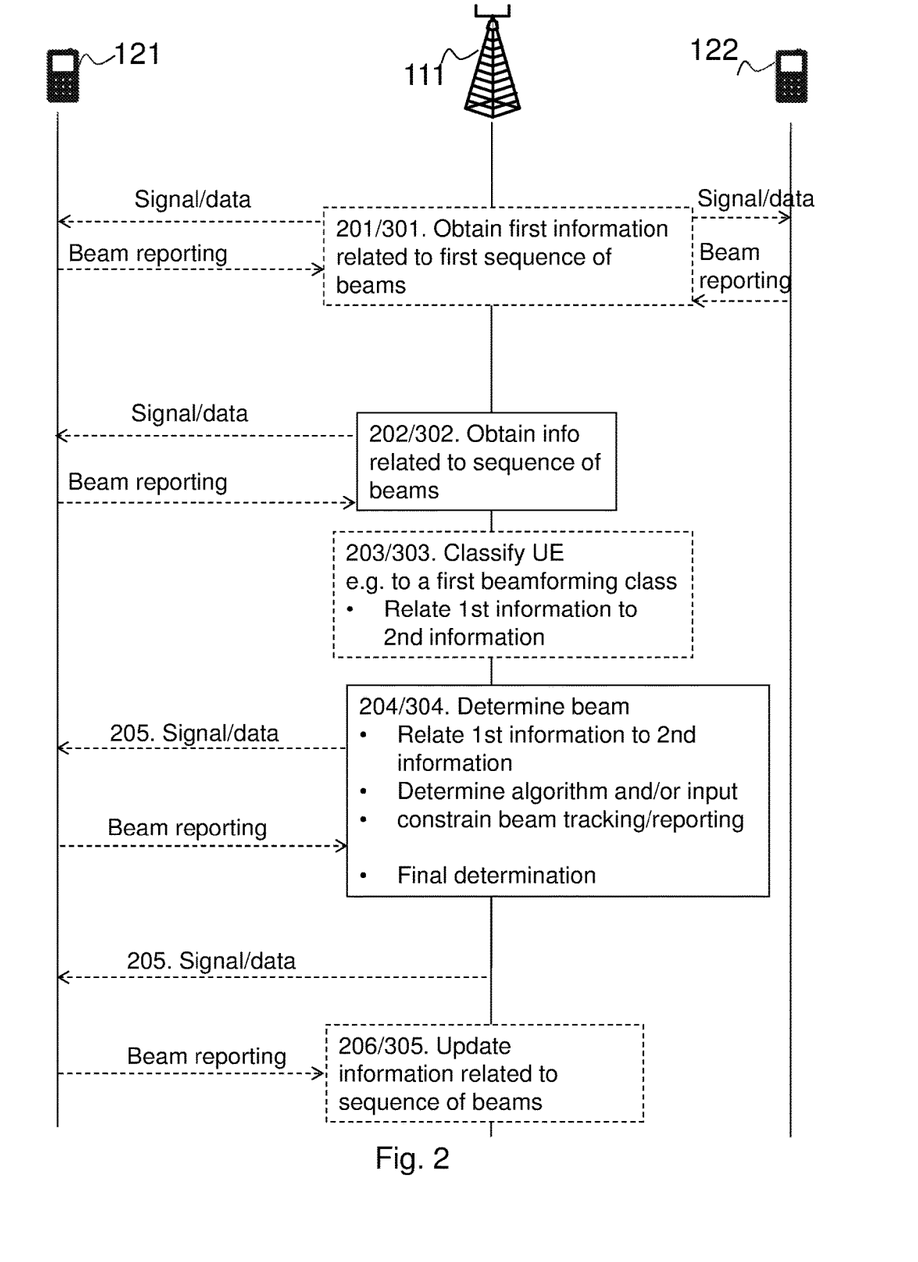
FIG. 2 is a combined signalling diagram and flow chart illustrating embodiments of a method performed in a wireless communications network.

FIG. 2 is a combined signalling diagram and flow chart that describes a method for determining the beam to direct the signal to be transmitted to the user equipment 121 according to embodiments herein.

Figure 3:
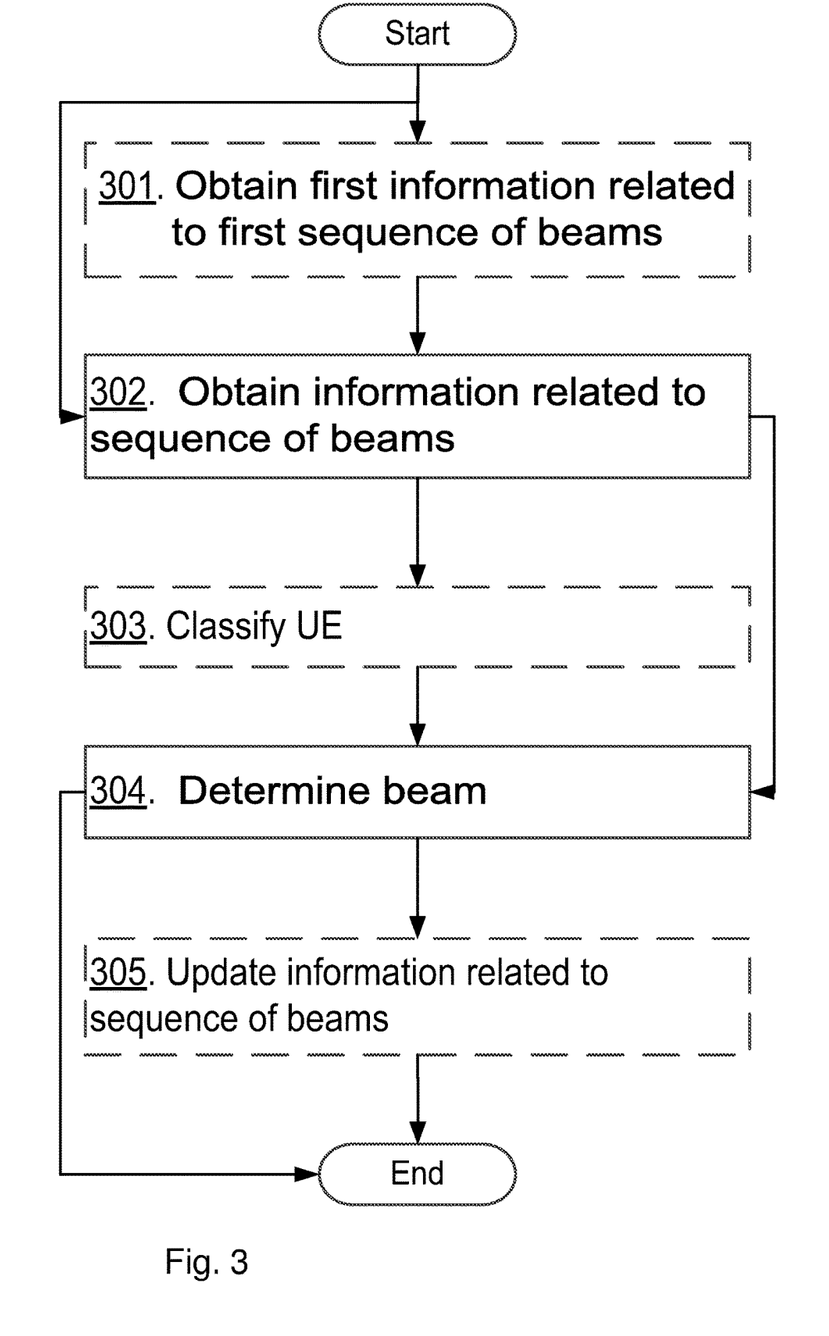
FIG. 3 is a flowchart illustrating embodiments of a method performed by a network node.

FIG. 3 is a flowchart that describes a method performed by the network node 111 for determining the beam to direct the signal to be transmitted to the user equipment 121 according to embodiments herein.

Figure 4A:
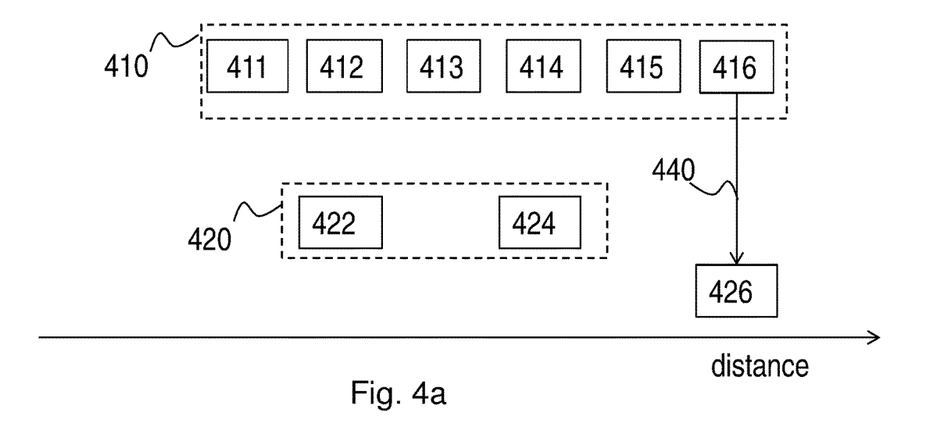
FIG. 4a is a schematic block diagram illustrating further embodiments of a method performed by a network node.
Figure 4B:
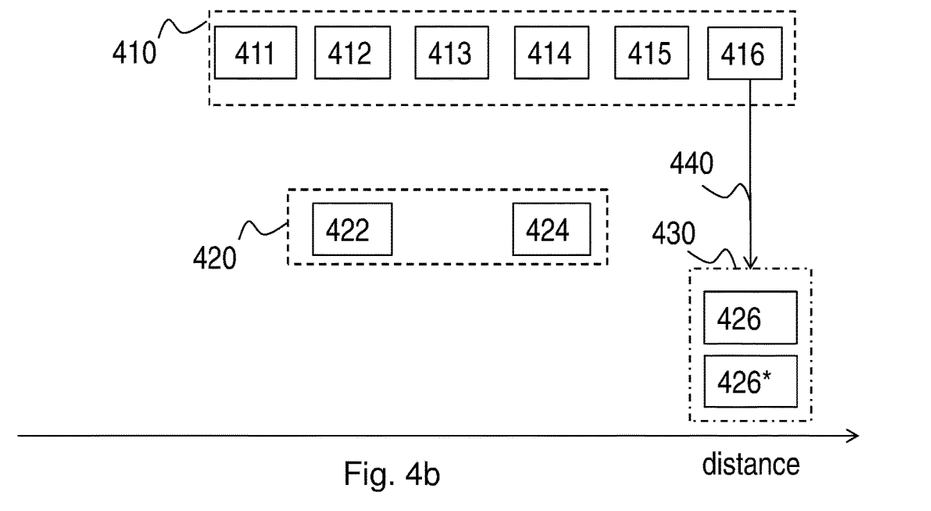
FIG. 4b is a schematic block diagram illustrating further embodiments of a method performed by a network node.
Figure 4C:
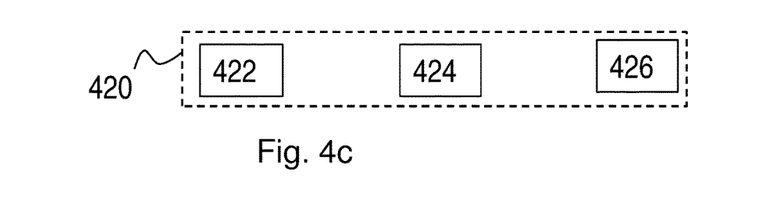
FIG. 4c is a schematic block diagram illustrating further embodiments of a method performed by a network node.

FIG. 4a, FIG. 4b and FIG. 4c are schematic block diagrams illustrating further details of a method performed by the network node 111, 115 for determining the beam. Specifically, FIGS. 4a, 4b and 4c illustrate different beam sequences and beams comprised in these beam sequences. FIGS. 4a and 4b illustrate simplified examples of how such determining may be performed. In both FIGS. 4 a and 4b a first sequence 410 of beams 411-416, comprising beams 411, 412, 413, 414, 415 and 416, has been obtained and stored by the network node 111, 115. The first sequence 410 of beams 411-416 may be associated with user equipment, such as the user equipment 121 and/or the second user equipment 122.

Presently a second sequence 420 of beams 422, 424 comprises a first beam 422 and a second beam 424. The second sequence 420 of beams 422, 424 is associated with the user equipment 121.

A task for the network node 111, 115 is to determine the next beam, 426, to be used after beam 424 for the user equipment 121.

Actions 201, 301

In some embodiments the network node 111, 115 obtains earlier information related to sequences of beams associated with user equipment. This earlier information may be used to correlate movement patterns of user equipment with earlier used beam sequences. With such correlations at hand, the network node 111, 115 may correlate present information related to a sequence of beams with a future beam to be used for the user equipment 121 in an improved way.

In other words, in some embodiments the network node 111, 115 obtains a first information related to a first sequence 410 of beams 411-416 associated with any one or more out of the user equipment 121 and the second user equipment 122. In an example this first information comprises beams 412, 414 or information about and/or related to beams 412, 414 that are associated with the second user equipment 122. Further, the first information may for example be used to build a data base of sequences of beams. The first information may also be used to make classes of user equipment based on information related to beams. The classes may later be used to classify user equipments, such as the user equipment 121.

In practice many first sequences may be obtained from different user equipment, such as the user equipment 121 and the second user equipment 122. The network node 111, 115 may process the first information to obtain combined sequences of beams or computed sequences of beams which may become useful when the network node 111, 115 is to determine beams in the future.

Figure 7:
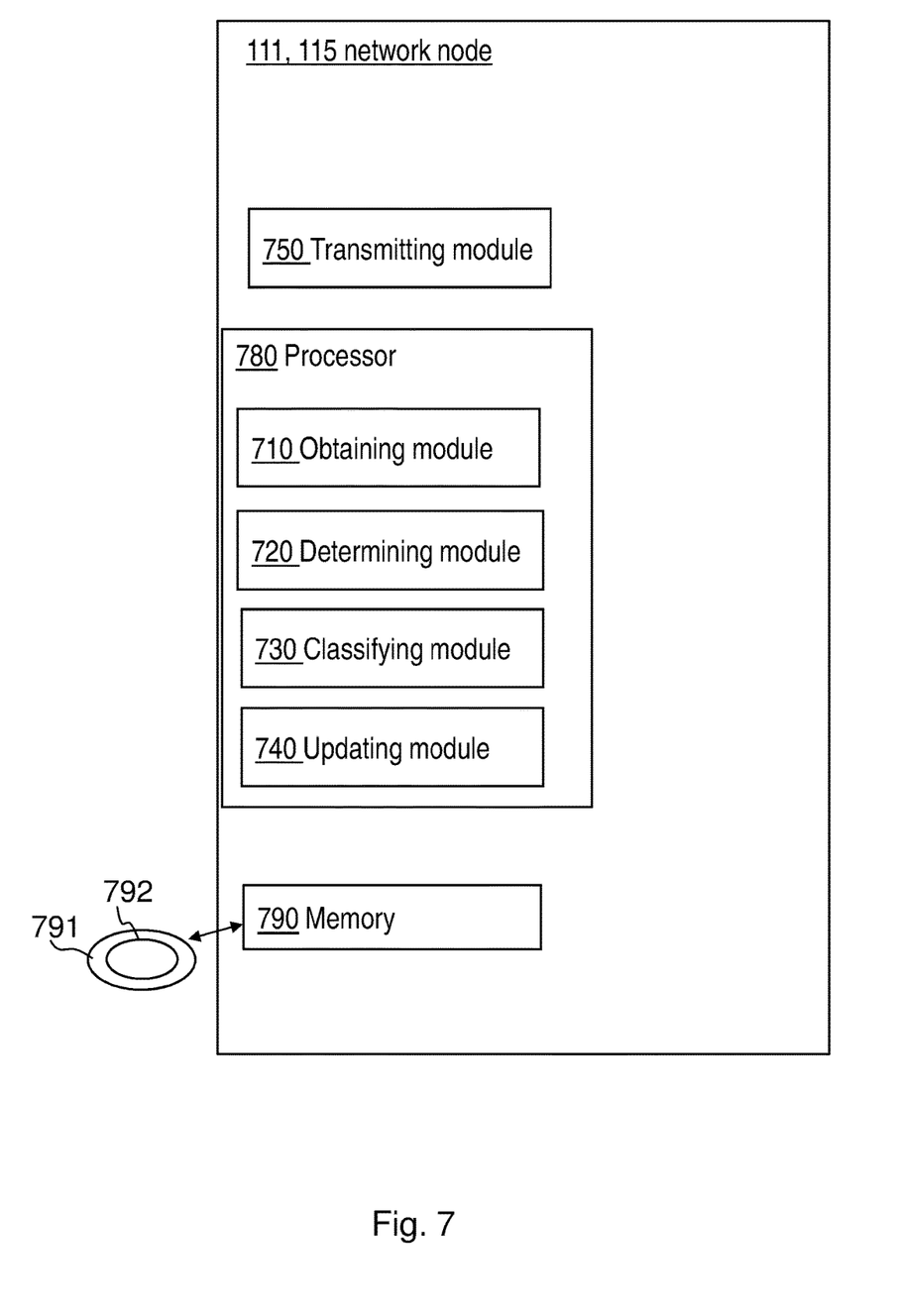
FIG. 7 is a schematic block diagram illustrating embodiments of a network node.

This action may be performed by an obtaining module 710 comprised in the network node 111, 115.

Actions 202, 302

When the network node 111, 115 is to determine the beam 426 for the user equipment 121, the network node 111, 115 obtains information related to a sequence 420 of beams 422, 424 associated with the user equipment 121. In general, the sequence of beams associated with different user equipment may comprise beams that have been measured, assigned to user equipment and not used, used and reported. The information will be used to determine the beam 426 to be used below in actions 203 and 303 by using the information to extrapolate the sequence 420 of beams 422, 424 to a future beam 426.

The information related to the sequence 420 of beams 422, 424 may comprise information related to a movement or a movement pattern of the user equipment 121. The information may for example comprise information about a position of the user equipment 121, a velocity of the user equipment 121 and direction of the user equipment 121. An example of such information may be whether the user equipment 121 reduces its speed on a highway before an exit such that the network node 111, 115 may conclude whether the user equipment 121 will continue its movement in one or another specific direction. Another example is when there is a red-light. If the cars ahead are slowing down, then it is probable that the user equipment will as well. Another example is a scenario where there are common paths, for example along roads, highways, sidewalks, such that the network node 111, 115 may extract information of the most probable movement pattern.

In some embodiments when the network node 111, 115 has obtained the first information related to the first sequence 410 of beams 411-416 then the information related to the sequence 420 of beams 422, 424 associated with the user equipment 121 is a second information related to a second sequence 420 of beams 422, 424 associated with the user equipment 121. The first sequence 410 of beams 411-416 may be a historic sequence 420 of beams 422, 424 that have been stored for example in a database and that is somehow related to the second sequence 420 of beams 422, 424. By relating the first information to the second information, e.g. by relating the first sequence 410 of beams 411-416 to the second sequence 420 of beams 422, 424, the network node 111, 115 may use historic knowledge about for example correlations between sequences of beams, movements or movement patterns of user equipment and the result of the historic beamforming.

This action may be performed by the obtaining module 710 comprised in the network node 111, 115.

Actions 203, 303

The user equipments may be classified in different beam forming classes, e.g., user equipment that share beam forming statistics or beam forming patterns. In an example the network node 111 classifies the user equipment to a first beam forming class. The first beam forming class may for example be related to user equipment moving with high velocities on highways.

In other words, in some embodiments the network node 111, 115 classifies the user equipment 121 based on the information related to the sequence 420 of beams 422, 424.

In some embodiments when the network node 111, 115 has obtained both the first information in action 201/301 and the second information in action 202/302 above, classifying the user equipment 121 may comprise relating the first information to the second information. This may be used to improve the determination of the beam 426, for example regarding the determination time, as described below in relation to actions 204 and 304. The determination time may for example be shortened by relating to each class a relatively small set of beams which the network node 111, 115 may choose from when determining the beam 426.

This action may be performed by a classifying module 730 comprised in the network node 111, 115.

Actions 204, 304

The network node 111, 115 determines the beam 426 to direct the signal to be transmitted to the user equipment 121 based on the information related to the sequence 420 of beams 422, 424. Determining may for example comprise calculating and/or selecting.

The determination of the beam 426 is improved since the information related to the sequence 420 of beams 422, 424 is used to extrapolate the sequence 420 of beams 422, 424 to the future beam 426. The extrapolation is optionally performed also based on earlier stored beam sequences or beam patterns which may be related to the sequence 420 of beams 422, 424. An improvement may for example be a shortened determination time. The network node may for example restrict the beam search space to those beams that are most probable to be relevant based on a beforehand collected database of sequences of beams. Therefore, in some embodiments when the network node 111, 115 has obtained both the first information in action 201/301 and the second information in action 202/302 above, determining the beam 426 is further based on a result of relating the first information to the second information. Relating the first information to the second information may for example comprise comparing the second sequence 420 of beams 422,

424 with the first sequence 410 of beams 411-416 and determining that the two beams have partly the same content. Another example comprises relating or associating the second sequence 420 of beams 422, 424 to a beamforming class which is based on the first sequence 410 of beams 411-416.

FIG. 4a illustrates a simplified example of how such determining may be performed. The first sequence 410 of beams 411-416 has been obtained and stored. The second sequence 420 presently comprises beams 422, 424. The network node 111, 115 is about to determine the next beam 426 for the user equipment 121. When the network node 111, 115 has related the second information to the first information the network node 111, 115 may for example use the beam 416 as a starting point for beam tracking and or beam reporting. This is illustrated with the arrow 440. The first information and the second information may be related by for example having the same or similar content or partly the same or similar content.

Determining the beam 426 may further comprise determining any one or more out of a beam forming algorithm and an input to the beam forming algorithm, based on the information related to the sequence 420 of beams 422, 424. An example of an input to the beam forming algorithm is a velocity of the user equipment 121. In an example related to FIG. 4a the user equipment 121 moves or travels with a higher velocity than the second user equipment 122 did at the time for the first sequence 410 of beams 411-416. The first sequence 410 of beams 411-416 is related to the second user equipment 122. In this example it is assumed that there is a match between the first sequence 410 of beams 411-416 and the second sequence 420 of beams 422, 424 in FIG. 4a. However, the network node 111, 115 may use only every second beam for the sequence 420 of beams 422, 424 used for the user equipment 121 compared to the sequence 420 of beams 422, 424 of the slower second user equipment 122 due to the velocity difference. The beams in this case do not have to be sampled from fixed beams but may also be interpolated beams.

In some embodiments determining the beam 426 comprises constraining any one or more out of a beam tracking and a beam reporting, to a set 430 of determined beams 426, 426* based on the information related to the sequence 420 of beams 422, 424. This is illustrated in FIG. 4b. As mentioned above in action 203/303, by restricting the number of beams to choose from, the determining time may be improved, which improves the chances of the determined beam 426 to be a suitable beam for the user equipment 121 also when the user equipment 121 is moving, e.g. with high speed.

Further, when the network node 111, 115 has obtained both the first information and the second information, determining the beam 426 may comprise constraining any one or more out of the beam tracking and the beam reporting to the set 430 of determined beams 426, 426*. In this case determining the beam 426 may further be based on a result of relating the first information to the second information and further based on the first sequence 410 of beams 411-416.

As mentioned above in relation to action 203/303 the classification may speed up the determination. Therefore determining the beam 426 based on the information related to the sequence 420 of beams 422, 424 may comprise that it is based on a result of classifying the user equipment 121. The result may for example be a beamforming class, such as a first beamforming class. The determination may be realised by using sets of determined beams 426, 426* for each beamforming class. Preferably, the sets of determined beams 426, 426* are relatively small.

This action may be performed by a determining module 720 comprised in the network node 111, 115.

Actions 205, 305

Once the beam 426 or the set 430 of beams 426, 426* has been determined they may be used for transmitting the signal to the user equipment 121.

In some embodiments the determined beam 426 or set 430 of beams 426, 426* are used for initial transmissions to the user equipment 121. For example, any one or more out of the beam forming, the beam tracking and the beam reporting may be based on the determined beam 426 or set 430 of beams 426, 426*. Specifically, any one or more out of the beam forming algorithm, the beam tracking and/or beam reporting may be initialized based on the set 430 of determined beams 426, 426*.

A final determination of the beam 426 for a specific signal to be transmitted may be performed after the initial transmissions, which may comprise beam tracking and/or beam reporting. Such final determination may thus also be based on the information related to the sequence 420 of beams 422, 424 associated with the user equipment 121.

Once a final determination of the beam 426 to direct the signal to be transmitted has been made the signal may be transmitted using the finally determined beam 426.

This action may be performed by a transmitting module 750, such as a transmitter, comprised in the network node 111, 115.

Actions 206, 306

The network node 111, 115 may keep collecting data related to the beam forming behavior of user equipment, such as the user equipment 121, and may update the prior information. For example, the network node 111, 115 may keep monitoring the used precoders/beamforming vectors and update the database accordingly.

In other words, in some embodiments when the network node 111, 115 has determined the beam 426, the network node 111, 115 updates the information related to the sequence 420 of beams 422, 424 based on information related to the beam 426. The updated sequence 420 of beams 422, 424, 426 then comprises the determined beam 426. This is illustrated in FIG. 4c.

This action may be performed by an updating module 740 comprised in the network node 111, 115.

Figure 5:
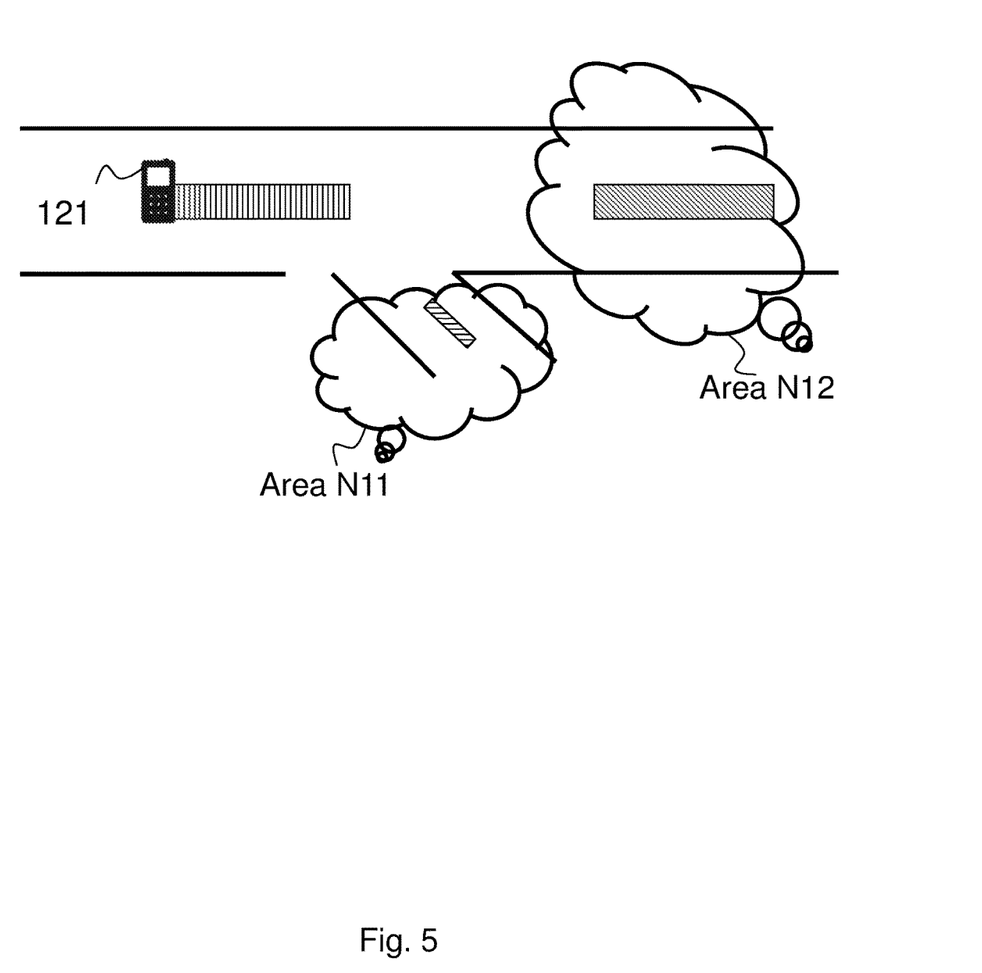
FIG. 5 is a schematic block diagram illustrating further embodiments of a method performed by a network node.
Figure 6:
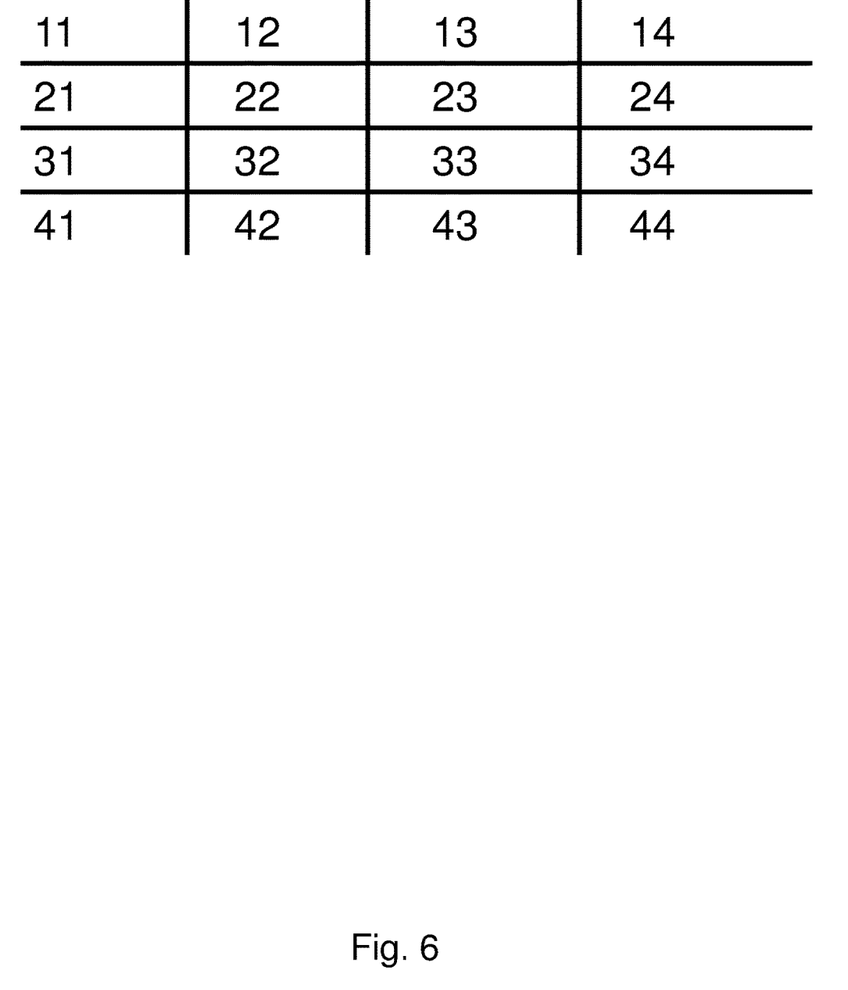
FIG. 6 is a schematic block diagram illustrating further embodiments of a method performed by a network node.

Further Details of Embodiments Relating to FIGS. 5 and 6

Movement Pattern

If the network node 111, 115 detects a certain pattern in movement of the user equipment 121, it may apply beams which have shown to be efficient in similar situations. This may involve collecting beam choices for different user equipment and making some kind of summary of the collected beam choices and related information. For example, on a highway, there may be an exit which in practice typically means that user equipment, such as the user equipment 121, travelling along the highway will either continue along the highway or slow down and turn towards the exit. If the network node 111, 115 notices a speed reduction of the user equipment 121, it may apply the beams of the sequence of beams which comprises historical beamforming choices. If the user equipment 121 is still moving in a high pace, the network node 111, 115 may apply a corresponding sequence of beams used for such historical high speed user equipment. This has been illustrated in FIG.

5. The user equipment 121 is travelling on a highway and approaches an exit. Based on the speed, the network node 111, 115 may use the beams best suited for each area, N11 or N12. More precisely, if the speed of the user equipment 121 shows a decrease, then the network node 111, 115 may conclude that the user equipment 121 will exit the highway. Then the network node 111, 115 uses the beams that are known to be suited for area N11. These beams and/or information related to these beams may be stored in a memory 790 comprised in the network node 111, 115 and the beams and/or the information related to the beams may be updated regularly. If on the other hand the speed of the user equipment 121 remains the same, then the network node 111, 115 concludes that the user equipment 121 will continue along the highway and hence uses the beams that are suited for area N12.

Beam Sequence History

This scheme is based on the history of beam sequences used over time. The network node 111, 115 may notice that a certain set of beams are used consecutively over time. This may be understood from the illustrative example given in FIG. 6. In FIG. 6, a table is depicted which has been obtained from historical beam tracing of the user equipment 121. Each number in each table element depicted in FIG. 6 corresponds to a beam. For instance, assume for the user equipment 121 that currently a preferred beam is beam 23, and a previous preferred beam has been beam 13. Based on the previously obtained information stored in the table the next beam is expected to be beam 33. This scheme in general may be used to detect the movement pattern explained in the paragraph above.

User Based

In this scheme, the behavior of the user equipment, such as the user equipment 121, are monitored over time and stored. Then a preferred beam for the user equipment 121 in combination with the time and/or specific behavior may be stored in a memory, such as the memory 790, to be used later for better estimation of the beam to be used. For example, the user equipment 121 who has a daily routine may be detected and once detected, preferred beamforming vectors may be used. This may either be implemented as described above in relation to the description of FIG. 5 or by storing the identity of the user equipment 121 and apply beamforming according to what historical data has shown to be effective for the user equipment 121.

Group Based

Another aspect of a user equipment based scheme is to utilize a behavior of other user equipment. In some cases, the movement or movement pattern of user equipment, such as the user equipment 121, may be dependent of the movement or movement pattern of other user equipment, such as the second user equipment 122. Sequences for such behavior may be found with historical data and be applied such that the beamforming take into account information associated with other user equipment. For example, if a traffic light turns red and the car closest to the red light slows down, it is probable that cars behind will do the same.

Another example of this is a group of user equipment travelling together for instance on a bus or a train. Then the determination of a beam for the user equipment 121 may be based on measurements by another user equipment. In this case, the network node 111, 115 keeps track of different user equipment and also finds similar beam patterns among user equipment to find a beamforming with a high performance, e.g. the highest, for each user equipment.

In embodiments herein the network node 111, 115 collects information related to the sequence of beams associated with the user equipment 121. The information may be available at the network node 111, 115. The information may be obtained in any of the exemplary ways as explained above. In another embodiment, the user equipment 121 may signal this information to the network node 111, 115. That is, the user equipment 121 may inform the network node 111, 115 about its movement for an amount of time, that may be agreed upon a priori or may be extended for an arbitrary amount of time, or may send the information in a periodic manner to keep the network node 111, 115 updated of its intentions. In another embodiment, the network node 111, 115 may request the user equipment 121 to update this information.

The collected information may also be based on for example traffic information, e.g. from the news. If that information provides information related to a difference in a typical movement or movement pattern of the user equipment 121, then that information may be useful information on how to change the beamforming.

Consider for example a highway where the speed limit is sometimes changed during certain times of the day depending on the traffic situation. During some hours of the day, there may be traffic jams which affect the movement pattern of user equipments, such as the user equipment 121, travelling in cars.

In this case, if the network node 111, 115 collects information related to the speed limit on the highway, for example that the speed limit is set to 70 km/h, the network node 111, 115 may base the beamforming algorithm on a sequence of beams during a similar period in the past. That is, from the past when there was a speed limit of 70 km/h. When the network node 111, 115 collects information indicating that the speed limit is 110 km/h then the network node 111, 115 may base the beamforming algorithm on a sequence of beams during a period with 110 km/h as speed limit.

In other words, the network node 111, 115 may collect information which gives a better understanding of the properties of for example the movement or movement pattern of the user equipment 121. Such information may be derived from surrounding conditions, such as weather, roadwork, time of day etc. in addition to or instead of the radio behaviour of the user equipment 121.

Then the network node 111, 115 determines, e.g. by calculation, the beam 426, or in other words the precoder or beamforming vector, that is to be used for the user equipment 121, based on the available information for the user equipment 121.

In a following action, the beam 426 or a set 430 of beams 426, 426* that are determined for the user equipment 121 may be used for transmissions to the user equipment 121.

The network node 111, 115 may also update the sequence of beams that are specific for each area and/or scenario. Also, information related to the user equipment 121 may be stored, for example in the memory 790.

To perform the method actions for determining the beam to direct the signal to be transmitted to the user equipment 121 described above in relation to FIG. 2 and FIG. 3, the network node 111, 115 comprises the following arrangement depicted in FIG. 7.

The network node 111, 115 and the user equipment 121 are each configured to operate in the wireless communications network 100.

The network node 111, 115 is configured to, e.g. by means of the obtaining module 710 configured to, obtain information related to the sequence 420 of beams 422, 424 associated with the user equipment 121.

The information related to the sequence 420 of beams 422, 424 may comprise information related to the movement or the movement pattern of the user equipment 121.

The network node 111, 115 may further be configured to obtain the first information related to the first sequence 410 of beams 411-416 associated with any one or more out of the user equipment 121 and the second user equipment 122. Then the information related to the sequence 420 of beams 422, 424 associated with the user equipment 121 comprises the second information related to the second sequence 420 of beams 422, 424 associated with the user equipment 121.

The obtaining module 710 may be implemented by a receiver or a processor 780 in the network node 111, 115.

The network node 111, 115 is further configured to, e.g. by means of the determining module 720 configured to, determine the beam 426 based on information related to the sequence 420 of beams 422, 424.

In some embodiments the network node 111, 115 is configured to determine the beam 426 by being configured to constrain any one or more out of the beam tracking and the beam reporting to the set 430 of determined beams 426, 426* based on information related to the sequence 420 of beams 422, 424.

The network node may be configured to determine the beam 426 by being configured to determine any one or more out of the beam forming algorithm and an input to the beam forming algorithm, based on information related to the sequence 420 of beams 422, 424.

In some embodiments wherein the network node 111, 115 has obtained the first information and the second information, the network node 111, 115 is configured to determine the beam 426 further based on a result of relating the first information to the second information.

For example, the network node 111, 115 may be configured to determine the beam 426 by being configured to constrain any one or more out of the beam tracking and the beam reporting to the set 430 of determined beams 426, 426*. The network node 111, 115 may then be configured to constrain any one or more out of the beam tracking and the beam reporting to the set 430 of determined beams 426, 426* further based on the result of relating the first information to the second information and further based on the first sequence 410 of beams 411-416.

The network node 111, 115 may be further configured to determine the beam 426 based on information related to the sequence 420 of beams 422, 424 by being configured to determine the beam 426 based on the result of classifying the user equipment 121.

The determining module 720 may be implemented by the processor 780 in the network node 111, 115.

The network node 111, 115 may further be configured to, e.g. by means of the classifying module 730 configured to, classify the user equipment 121 based on information related to the sequence 420 of beams 422, 424.

The classifying module 730 may be implemented by the processor 780 in the network node 111, 115.

The network node 111, 115 may further be configured to, e.g. by means of the updating module 740 configured to, update information related to the sequence 420 of beams 422, 424 based on information related to the beam 426 when the network node 111, 115 has determined the beam 426.

The updating module 740 may be implemented by the processor 780 in the network node 111, 115.

The embodiments herein for determining the beam 426 to direct the signal to be transmitted to the user equipment 121 may be implemented through one or more processors, such as the processor 780 in the network node 111, 115 depicted in FIG. 7 together with computer program code for performing the functions and actions of the embodiments herein. The program code mentioned above may also be provided as a computer program product 791 for instance in the form of a data carrier carrying computer program code 792 for performing the embodiments herein when being loaded into the network node 111, 115. One such carrier may be in the form of a CD ROM disc. It is however feasible with other data carriers such as a memory stick. The computer program code may furthermore be provided as pure program code on a server and downloaded to.

Thus, the methods according to the embodiments described herein for the network node 111, 115 may be implemented by means of a computer program product, comprising instructions, i.e., software code portions, which, when executed on at least one processor, cause the at least one processor to carry out the actions described herein, as performed by the network node 111, 115. The computer program product may be stored on a computer-readable storage medium. The computer-readable storage medium, having stored there on the computer program, may comprise the instructions which, when executed on at least one processor, cause the at least one processor to carry out the actions described herein, as performed by the network node 111, 115. In some embodiments, the computer-readable storage medium may be a non-transitory computer-readable storage medium.

Those skilled in the art will also appreciate that the obtaining module 710, the determining module 720, the classifying module 730 and the updating module 740 described above may refer to a combination of analogue and digital circuits, and/or one or more processors configured with software and/or firmware, e.g. stored in the memory 790 that when executed by the one or more processors such as the processor 780 perform as described above. One or more of these processors, as well as the other digital hardware, may be included in a single ASIC, or several processors and various digital hardware may be distributed among several separate components, whether individually packaged or assembled into a SoC.

The network node 111, 115 may further be configured to, e.g. by means of the memory 790 configured to, store for example, the information related to the sequence of beams, the first information, the second information, the sequence of beams, classifications, information related to user equipments, beam forming algorithms, inputs to the beam forming algorithms and configurations, schedulings and applications etc. to perform the methods herein when being executed in the network node 111, 115. The memory 790 comprises one or more memory units.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP LTE/SAE has been used in this disclosure to exemplify the embodiments herein, this should not be seen as limiting the scope of the embodiments herein to only the aforementioned system. Other wireless systems may also benefit from exploiting the ideas covered within this disclosure.

Also note that terminology such as a first network node and a second network node should be considered to be non-limiting and does in particular not imply a certain hierarchical relation between the two.

The invention claimed is:

1. A method performed by a network node for determining a beam to direct a signal to be transmitted from the network node to a user equipment, which network node and which user equipment operate in a wireless communications network (100), the method comprising:
    obtaining information related to a sequence of beams associated with the user equipment,
    determining the beam based on the information related to the sequence of beams, wherein determining the beam comprises constraining any one or more out of a beam tracking and a beam reporting, to a set of determined beams based on the information related to the sequence of beam, and
    directing and transmitting, to the user equipment, the signal based on the determined beam.

2. The method according to claim 1, wherein the information related to the sequence of beams comprises information related to a movement or a movement pattern of the user equipment.

3. The method according to claim 1, wherein determining the beam comprises determining a beam forming algorithm and an input to the beam forming algorithm, based on the information related to the sequence of beams.

4. The method according to claim 1, further comprising classifying the user equipment based on the information related to the sequence of beams, and wherein determining the beam based on the information related to the sequence of beams comprises that it is based on a result of classifying the user equipment.

5. The method according to claim 1, further comprising obtaining a first information related to a first sequence of beams, the first information being associated with at least one of the user equipment and a second user equipment, wherein the information related to the sequence of beams associated with the user equipment is a second information related to a second sequence of beams associated with the user equipment, and wherein determining the beam is further based on a result of relating the first information to the second information.

6. The method according to claim 5, wherein determining the beam comprises constraining any one or more out of the beam tracking and the beam reporting to the set of determined beams, further based on the result of relating the first information to the second information and further based on the first sequence of beams.

7. The method according to claim 1, further comprising:
    when the network node has determined the beam, updating the information related to the sequence of beams based on information related to the beam.

8. A network node for determining a beam to direct a signal to be transmitted from the network node to a user equipment, which network node and which user equipment are configured to operate in a wireless communications network, the network node being configured to:
    obtain information related to a sequence of beams associated with the user equipment,
    determine the beam based on the information related to the sequence of beams, wherein determining the beam comprises constraining any one or more out of a beam tracking and a beam reporting, to a set of determined beams based on the information related to the sequence of beams, and
    direct and transmit, to the user equipment, the signal based on the determined beam.

9. The network node according to claim 8, wherein the information related to the sequence of beams comprises information related to a movement or a movement pattern of the user equipment.

10. The network node according to claim 8, configured to determine the beam by being configured to determine a beam forming algorithm and an input to the beam forming algorithm, based on the information related to the sequence of beams.

11. The network node according to claim 8, further configured to:
    classify the user equipment based on the information related to the sequence of beams, and wherein the network node is configured to determine the beam based on the information related to the sequence of beams by being configured to determine the beam based on a result of classifying the user equipment.

12. The network node according to claim 8, further configured to:
    obtain a first information related to a first sequence of beams, the first information being related to at least one of the user equipment and a second user equipment, wherein the information related to the sequence of beams associated with the user equipment is a second information related to a second sequence of beams associated with the user equipment, and
    determine the beam further based on a result of relating the first information to the second information.

13. The network node according to claim 12, configured to determine the beam by being configured to constrain any one or more out of the beam tracking and the beam reporting to a set of determined beams, further based on the result of relating the first information to the second information and further based on the first sequence of beams.

14. The network node according to claim 8, further configured to update the information related to the sequence of beams based on information related to the beam when the network node has determined the beam.

* * * * *